US006260116B1

United States Patent
Davis et al.

(10) Patent No.: US 6,260,116 B1
(45) Date of Patent: Jul. 10, 2001

(54) SYSTEM AND METHOD FOR PREFETCHING DATA

(75) Inventors: Gordon Taylor Davis, Chapel Hill; Llewellyn Bradley Marshall, IV, Cary, both of NC (US); Clarence Rosser Ogilvie, Huntington; Paul Colvin Stabler, South Burlington, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,455

(22) Filed: Jul. 1, 1998

(51) Int. Cl.[7] ................................................... G06F 12/00
(52) U.S. Cl. ........................... 711/137; 711/163; 711/167
(58) Field of Search ..................... 711/137, 163, 711/167; 712/207, 225, 237; 717/9, 7

(56) References Cited

U.S. PATENT DOCUMENTS

| 4,956,803 | 9/1990 | Tayler et al. ........................... 364/900 |
| 5,317,727 | 5/1994 | Tsuchida et al. ...................... 395/600 |
| 5,357,618 | 10/1994 | Mirza et al. ........................... 395/400 |
| 5,377,336 | * 12/1994 | Eickemeyer et al. ................. 712/207 |
| 5,495,591 | 2/1996 | Ryan ................................. 395/421.03 |
| 5,511,178 | 4/1996 | Takeda et al. ........................ 395/452 |
| 5,704,053 | * 12/1997 | Santhanam ............................ 712/207 |
| 5,797,013 | * 8/1998 | Mahadevan et al. ..................... 717/9 |
| 5,854,934 | * 12/1998 | Hsu et al. ................................. 717/9 |
| 5,889,985 | * 3/1999 | Babaian et al. ........................ 712/225 |
| 5,918,045 | * 6/1999 | Nishii et al. ........................... 712/237 |
| 5,933,643 | * 8/1999 | Holler ....................................... 717/9 |
| 5,950,007 | * 9/1999 | Nishiyama et al. ....................... 717/7 |

FOREIGN PATENT DOCUMENTS

| 0 743 598 | 11/1996 | (EP) | ................. G06F/9/45 |
| 0 762 288 | 3/1997 | (EP) | ................. G06F/12/08 |
| 7-306790 | 11/1995 | (JP) | ................. G06F/9/44 |
| 9-22361 | 1/1997 | (JP) | ................. G06F/9/44 |

OTHER PUBLICATIONS

IBM Technical Disclosure Bulletin, vol. 36, No. 3, Mar. 1993 "Prefetching for the Iterations of an Indexed Loop".

"The Impact of Emerging Technologies on Computer Science and Operations Research" George Mason University, Fairfax, VA, USA Conference held Jan. 5–7, 1994 (published 1995). pp. 221–243.

* cited by examiner

Primary Examiner—Matthew Kim
Assistant Examiner—Fred F. Tzeng
(74) Attorney, Agent, or Firm—Scott W. Reid; John B. Frisone

(57) ABSTRACT

A method and system for prefetching data from storage and storing the data in a cache memory for use by an executing program includes means for detecting when a program has entered a processing loop and has completed at least one pass through the processing loop. At the completion of one pass through the processing loop, determining the requirement for additional data and prefetching the required data. Monitoring the operation of the program to detect termination of loop processing and terminating the prefetch of data from storage until the detection of a subsequent program loop.

6 Claims, 4 Drawing Sheets

SYSTEM AND METHOD FOR PREFETCHING DATA

BACKGROUND OF THE INVENTION

In processor designs which use a cache memory architecture, overall performance can be greatly improved by prefetching instructions from a bulk storage unit and placing then in a cache memory prior to the time the processor will be using them. This is easily accomplished with program instructions since they are sequential in nature. The sequential nature of program instructions allows a memory controller to prefetch a group of instructions and load them into a cache line based simply on the current instruction address. Prefetch mechanisms for data do not work very well since data, unlike program instructions, is generally not sequential in nature or arranged in the order the program will access it.

SUMMARY OF THE INVENTION

The invention contemplates a method and system for prefetching data from storage and storing the data in a cache memory for use by an executing program. The system includes means for detecting when a program has entered a processing loop and has completed at least one pass through the processing loop. At the completion of the at least one pass through the processing loop, means for determining the requirement for additional data and prefetching the required data, monitoring the operation of the program to detect termination of loop processing and terminating the prefetch of data from storage until the detection of a subsequent program loop.

DETAILED DESCRIPTION OF THE INVENTION

Figure 1:
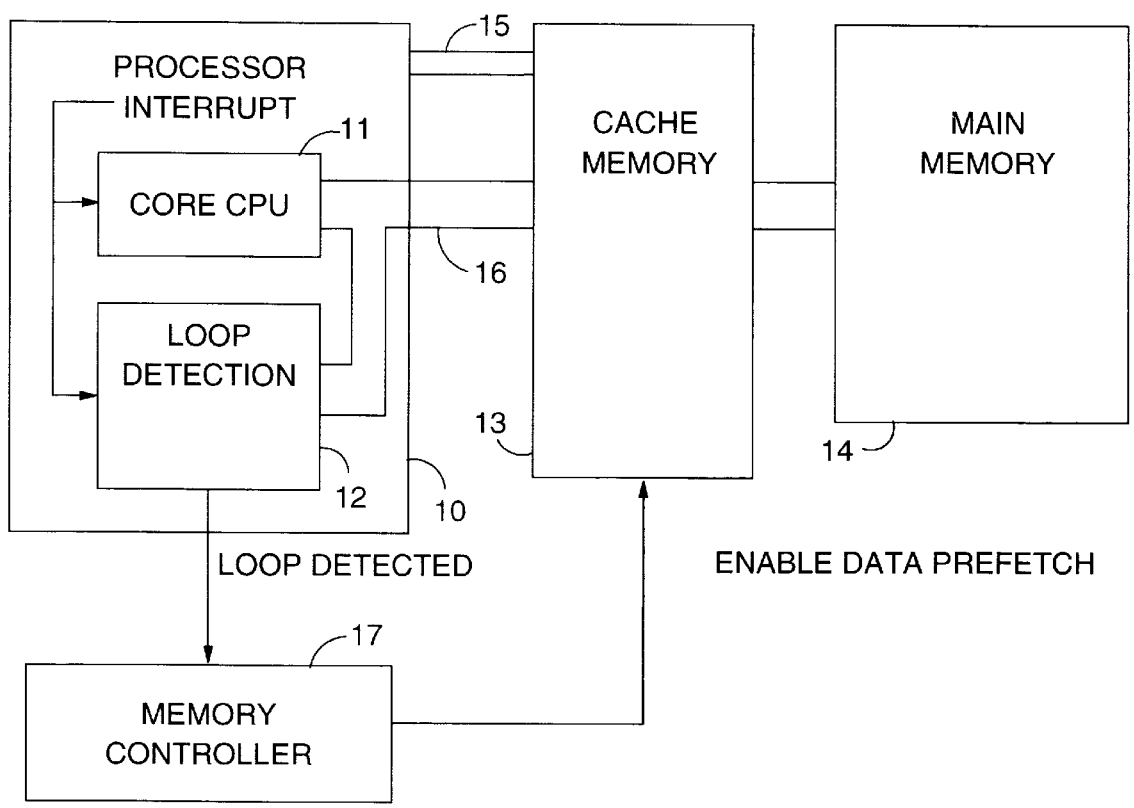
FIG. 1 is a block diagram illustrating a cache-based processing system using the invention.

In FIG. 1 a processor 10 which includes a core central processing unit (CPU) 11 and a loop detection circuit 12 is connected to a cache memory 13 and a main memory 14 by a data bus 15 and an address bus 16. The loop detection circuit 12 is connected to a memory controller circuit 17 which controls access to main memory 14. When a program executing in processor 10 enters a typical loop operation, the instructions required for executing the loop are moved from main memory 14 to cache memory 13 in the first iteration of the loop. Thereafter, successive iterations of the loop do not, with few exceptions, require additional fetching of instruction from main memory. During these intervals (loops subsequent to the first loop) the main memory is available for prefetching data required by the program. When loop detection circuit 12 detects the completion of the first iteration of a loop it send a control signal to memory controller 17 which in turn executes a prefetch algorithm (illustrated in FIG. 4 and described below). As soon as the loop terminates or an interrupt is issued by the hardware the control signal from the loop detector 12 drops and the data prefetch function is terminated.

Figure 2:
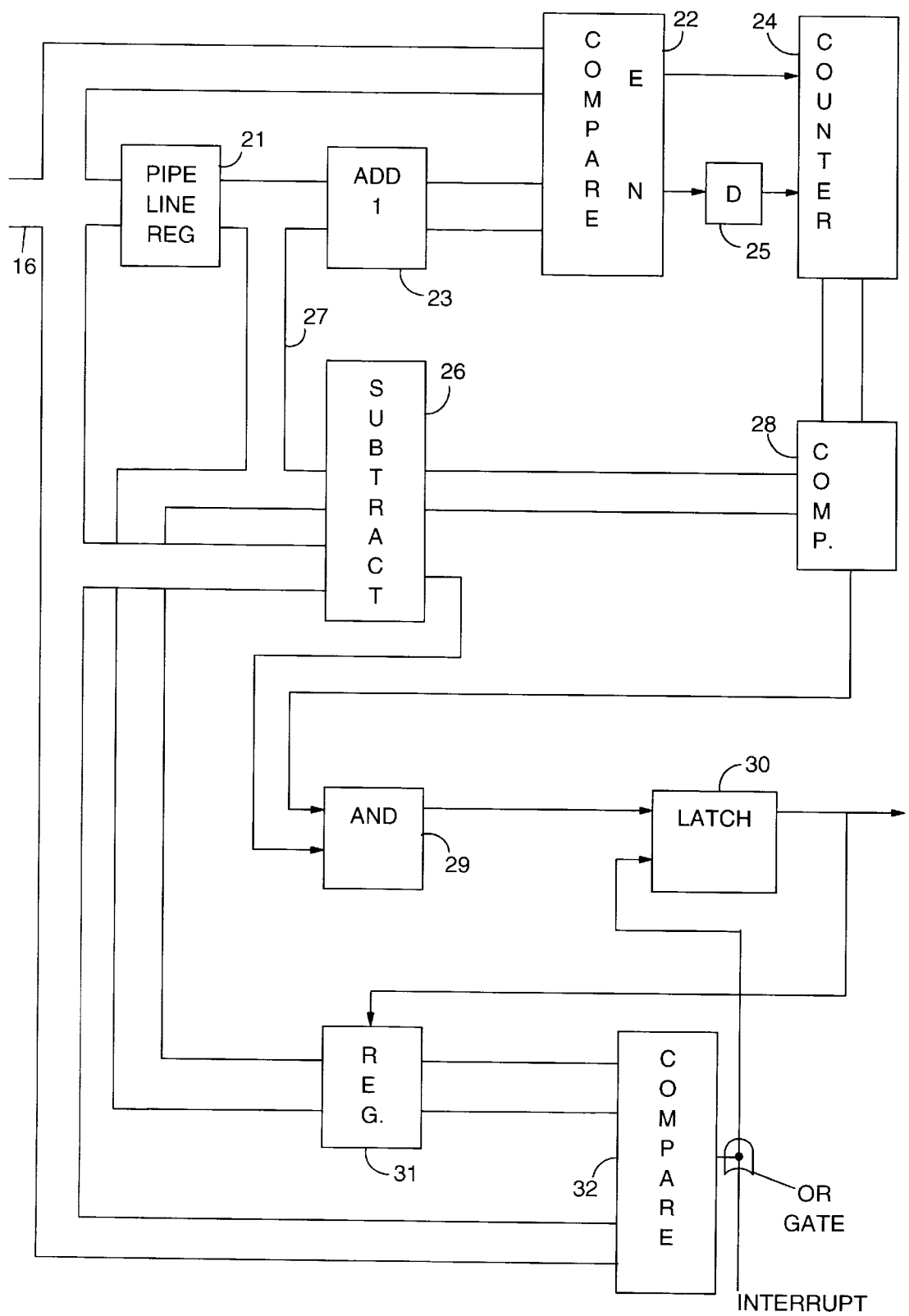
FIG. 2 is a detailed block diagram of the loop detection circuit illustrated in FIG. 1.

In FIG. 2, sequential instruction addresses on bus 16 are applied to a pipe line register 21 which introduces a one cycle delay and to one input of a comparison circuit 22. The output of register 21 on a bus 27 is incremented by one in circuit 23 and applied to the other input of compare circuit 22. If sequential instruction addresses differ by one, compare circuit 22 will provide an output E which is used to increment a counter 24. If they are not equal, circuit 22 will provide an output Which will reset counter 24 after a delay 25.

A circuit 26 subtracts the current instruction address on bus 16 from the output of pipeline register 21 on bus 27. A comparison circuit 28 provides an output suitable for enabling an AND gate 29 when the value of counter 24 is greater than or equal to the numeric value of circuit 26. Circuit 26 also provides an output to AND gate 29 which indicates the sign of its numeric output and will satisfy AND gate 29 when the output of circuit 26 is a positive value.

If the processor has entered a loop, counter 24 will be incremented as each instruction is fetched and the output of subtract circuit 26 will be one (1) and negative until the loop completes and returns to the first instruction. At that time, the output of subtract circuit 26 will be a positive integer equal to or less than the value of counter 24 (depending on the address stored in the pipe line register 21 when the program enters the loop) in view of the delay provided by circuit 25. That is, as loop back occurs inequality is detected by circuit 22, however because of the delay introduced by circuit 25 the output of compare circuit 28 maintains AND gate 29 enabled until the sign of circuit 26 goes positive. When this happens AND gate 29 sets a latch 30 which indicates the presence of a loop and is used to enable data prefetch as described above.

The circuit thus far described detects the completion of the first iteration of a loop. The remainder, described below, is concerned with termination of a loop. A register 31 connected to bus 27 is loaded with the contents of bus 27 when the latch 30 is set. Since latch 30 is set when loop back occurs, the contents of bus 27 identify the last instruction address in the loop. A comparison circuit 32 compares the contents of bus 16 with the output of register 31 and resets latch 30 when the address on bus 16 is greater than the last address of the loop provided by register 31. As described above, a processor interrupt will also reset latch 30 and terminate the prefetch function.

Figure 3:
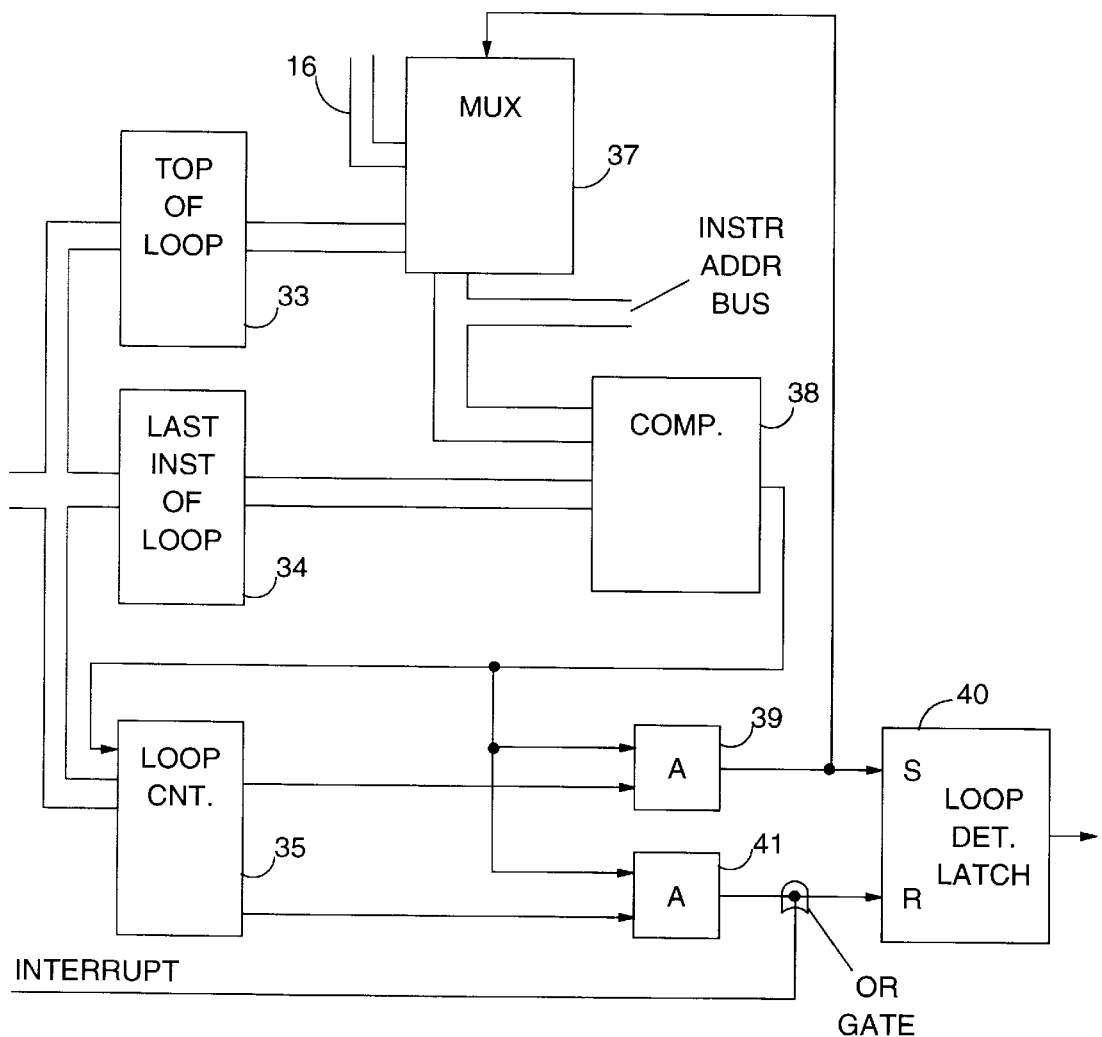
FIG. 3 is a detailed block diagram of an alternative loop detection circuit for use with special purpose processors (such as digital signal processors) which have built in hardware mechanisms for controlling loops and can provide information relative to loop execution.

An alternative loop detection circuit for use with processors which employ loop control hardware and can provide signals such as Top of Loop and Last Instruction Address and Loop Count is illustrated in FIG. 3. The Top and Last instruction addresses are loaded into registers 33 and 34, respectively. The loop count is loaded into a counter 35. The current instruction address on a bus 16 is applied via a multiplexer 37 to one input of a compare circuit 38 where it is compared to the contents of register 34. When equality is detected, circuit 38 provides an output which is applied to an AND gate 39 and to a counter 35 to decrement the count. As long as counter 35 is not zero AND gate 39 is enabled and provides an output to set a loop detected latch 40 after the first pass through the loop has completed.

The output of AND gate 39 is applied to the multiplexer 37 which switches the output of register 33 to the input of compare circuit 38. On the next cycle the top of loop instruction address from register 33 is applied to the input of circuit 38 and to the instruction address bus. At this time circuit 38 detects inequality causing the output from AND gate 39 to fall. This causes multiplexer 37 to switch back to bus 16 where the process repeats until the loop count from counter 35 reaches zero at which time AND gate 41 resets loop detect latch 40.

Figure 4:
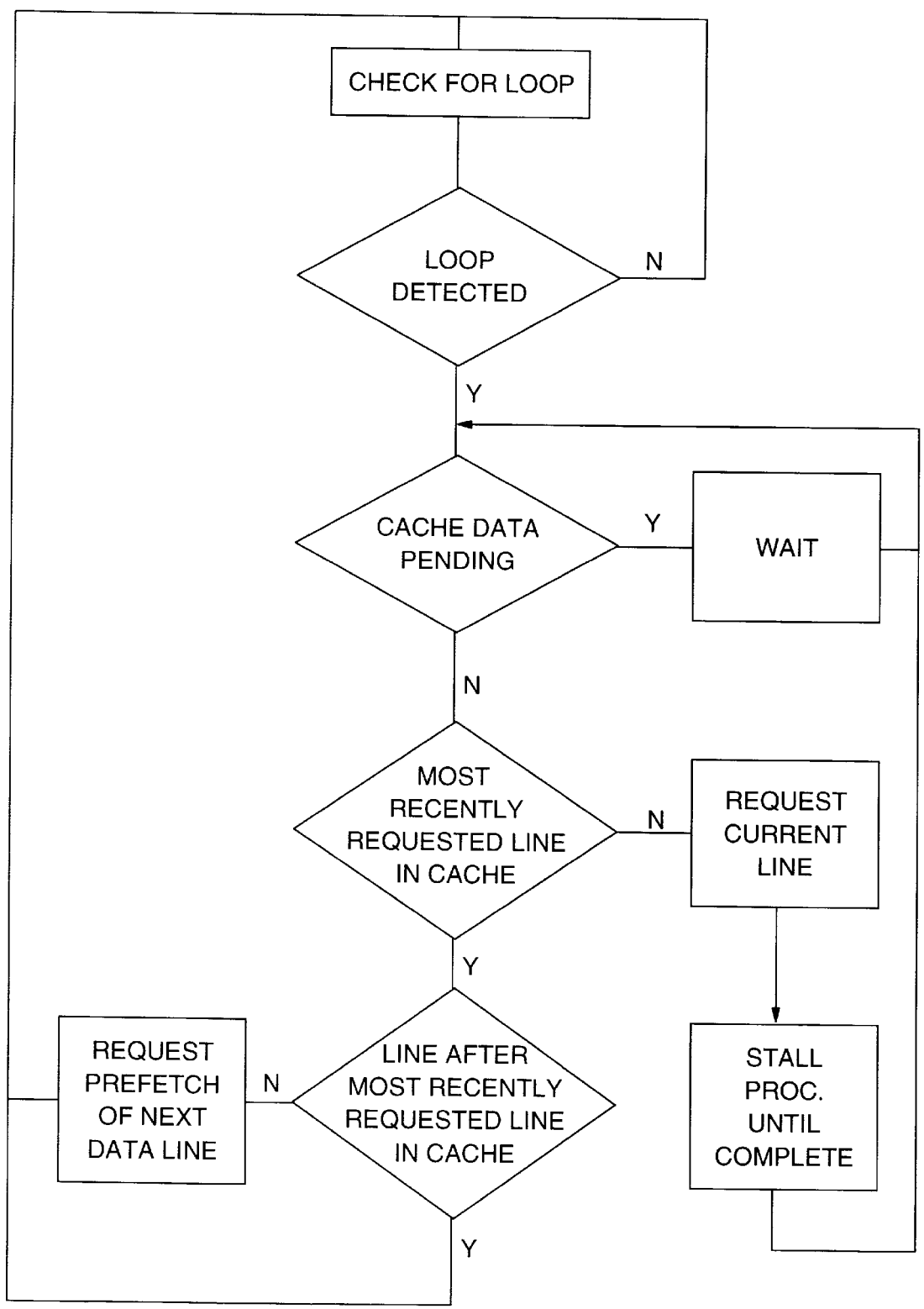
FIG. 4 is a flow diagram illustrating operation of the data prefetch mechanism.

The flow diagram illustrated in FIG. 4 defines the operation of the memory controller 17. The controller 17 in response to the loop detected signal determines if a cache data request is pending. If a cache data request is pending no action is taken until the request is satisfied. At that time a check is made to see if the current data line is in cache. If the line is not in the cache it is requested and the processor is stalled until the request is completed. If the current data line and the line after the current line are both in the cache the process repeats. If the data line after the current line is not in the cache, a prefetch of that data line is requested.

While several embodiments of the invention have been described and illustrated in detail it will be obvious to those skilled in this art that changes and modifications can be made without departing from the spirit and scope of the invention as set forth in the claims.

We claim:

1. In a processor system employing a cache memory for storing instruction addresses a system for prefetching data from storage and storing the data in the cache memory for use by an executing program comprising:

first means responsive to sequential program instruction addresses for detecting when a program has entered a processing loop and has completed at least one pass through the processing loop and providing an enabling signal indicative thereof, the first means including:

first counting means for accumulating a count of sequential numerical instruction addresses and providing an output indicative thereof;

second arithmetic means for examining sequential instruction addresses and providing a first predetermined output when the instruction addresses are sequential and a second output when they are not sequential; and, third logic means responsive to the first counting and second arithmetic means for providing enabling signals when their outputs have a predetermined relation;

second means responsive to the enabling signals from the first means for determining a requirement for additional data and prefetching the required data; and, third means for monitoring the operation of the program to detect termination of loop processing and for terminating the prefetch of data from storage.

2. The system set forth in claim 1 in which the second arithmetic means includes a circuit for subtracting a current instruction address from the next prior instruction address and providing an output indicative of the magnitude and the sign of the subtraction.

3. The system set forth in claim 2 in which the third logic means provides the enabling signals when the magnitude of the output from the first counting means is equal to or greater than the magnitude of the output from the second arithmetic means and the sign of the output is positive.

4. The system set forth in claim 3 in which the third means for monitoring operation of the program to detect termination of a detected loop includes means for comparing the last instruction address in a loop to the current instruction address and for providing the output signal to the second means when the current instruction address is greater than the last instruction address of the loop.

5. In a processor system employing a cache memory for storing instruction addresses a method for prefetching data required by an executing program from storage and storing the data in the cache memory for use by the executing program comprising the steps:

detecting when the program has entered a processing loop and has completed at least one pass through the processing loop;

at the completion of the at least one pass through the processing loop, determining a requirement for additional data and prefetching the required data and storing the data in the cache memory, which step includes substeps:

determining if the most recently requested data is located in the cache memory;

requesting the most recently requested data if it is not located in the cache memory and if it is located in the cache memory;

determining if the data immediately following the most recently requested data is resident in the cache memory and requesting the data immediately following the most recently requested data if it is not in the cache memory; and, monitoring the operation of the program to detect termination of loop processing and terminating the prefetch of data from storage until the detection of a subsequent program loop.

6. In a processor system employing a cache memory for storing instruction addresses and equipped with loop control hardware providing top of loop (TOL), last instruction address (LIA) and loop count (LC) signals, a method for prefetching data required by an executing program from storage and storing the data in the cache memory for use by the executing program comprising the steps:

comparing the current instruction address from the processor to the last instruction address (LIA);

at equality decrementing the loop count (LC), determining a requirement for additional data and prefetching the required data and storing the data in the cache memory if the loop count (LC) is not zero and forcing a branch on the next instruction, which step includes substeps:

determining if the most recently requested data is located in the cache memory;

requesting the most recently requested data if it is not located in the cache memory and if it is located in the cache memory;

determining if the data immediately following the most recently requested data is resident in the cache memory and requesting the data immediately following the most recently requested data if it is not in the cache memory; and, repeating the above steps until the loop count (LC) reaches zero at which time prefetching data is terminated.

* * * * *